US009553479B2

(12) United States Patent
Lee

(10) Patent No.: US 9,553,479 B2
(45) Date of Patent: Jan. 24, 2017

(54) METHOD FOR CONTROLLING WIRELESS CHARGING DEPENDING ON POSITION OF FOB KEY

(71) Applicant: Hyundai Motor Company, Seoul (KR)

(72) Inventor: Sang Min Lee, Gyeonggi-do (KR)

(73) Assignee: Hyundai Motor Company, Seoul (KR)

( * ) Notice: Subject to any disclaimer, the term of this patent is extended or adjusted under 35 U.S.C. 154(b) by 169 days.

(21) Appl. No.: 14/526,847

(22) Filed: Oct. 29, 2014

(65) Prior Publication Data

US 2015/0171659 A1    Jun. 18, 2015

(30) Foreign Application Priority Data

Dec. 18, 2013 (KR) .......................... 10-2013-0158401

(51) Int. Cl.
*H02J 7/02* (2016.01)
*H02J 17/00* (2006.01)

(52) U.S. Cl.
CPC ............... *H02J 7/025* (2013.01); *H02J 17/00* (2013.01)

(58) Field of Classification Search
CPC .................................. H02J 7/025; H02J 17/00
USPC ....................................................... 320/108
See application file for complete search history.

(56) References Cited

U.S. PATENT DOCUMENTS

| | | | | |
|---|---|---|---|---|
| 2010/0198428 A1* | 8/2010 | Sultan | ................ | G07C 9/00309 701/2 |
| 2012/0280574 A1* | 11/2012 | Hur | ..................... | H04B 5/0037 307/104 |
| 2012/0299538 A1* | 11/2012 | Arai | ...................... | B60L 11/182 320/108 |
| 2013/0307474 A1* | 11/2013 | Shimura | ............... | H01M 10/46 320/108 |
| 2014/0103865 A1* | 4/2014 | Van Wiemeersch | .... | H02J 17/00 320/108 |
| 2014/0203770 A1* | 7/2014 | Salter | .................... | H02J 7/0047 320/108 |
| 2015/0015198 A1* | 1/2015 | Okada | .................. | B60R 25/406 320/108 |

(Continued)

FOREIGN PATENT DOCUMENTS

| | | |
|---|---|---|
| JP | 2013-070545 A | 4/2013 |
| KR | 20090012633 A | 2/2009 |

(Continued)

*Primary Examiner* — Yalkew Fantu
*Assistant Examiner* — Manuel Hernandez
(74) *Attorney, Agent, or Firm* — Mintz Levin Cohn Ferris Glovsky and Popeo, P.C.; Peter F. Corless

(57) ABSTRACT

A method for controlling wireless charging depending on a position of an FOB key in a wireless charging system provided in a vehicle and including an output unit, a wireless charging mount, and a controller, includes: transmitting, by the controller, a first signal informing a peripheral region of the wireless charging mount in which a wireless charging target is mounted that wireless charging is being performed in the peripheral region of the wireless charging mount in the case in which the wireless charging starts; transmitting, by the FOB key receiving the first signal, a second signal corresponding to the first signal to the controller; stopping, by the controller receiving the second signal, the wireless charging; and informing, by the controller, a user of the vehicle that the FOB key is present in the peripheral region of the wireless charging mount through the output unit.

6 Claims, 4 Drawing Sheets

(56) References Cited

U.S. PATENT DOCUMENTS

2015/0042167 A1* 2/2015 Kim .................. H02J 17/00
307/104
2015/0326062 A1* 11/2015 Gonzalez Valdez .... H02J 17/00
320/108

FOREIGN PATENT DOCUMENTS

| KR | 20100025324 A | 3/2010 |
| KR | 10-2011-0105470 A | 9/2011 |
| KR | 20130022589 A | 3/2013 |
| KR | 20130047722 A | 5/2013 |
| WO | 2012/162288 A1 | 11/2012 |

* cited by examiner

METHOD FOR CONTROLLING WIRELESS CHARGING DEPENDING ON POSITION OF FOB KEY

CROSS-REFERENCE TO RELATED APPLICATION

This application is based on and claims under 35 U.S.C. §119(a) priority from Korean Patent Application No. 10-2013-0158401, filed on Dec. 18, 2013 in the Korean Intellectual Property Office, the disclosure of which is incorporated herein in its entirety by reference.

BACKGROUND (a) Field of the Invention

The present invention relates to a method for controlling wireless charging depending on a position of an FOB key, and more particularly, to a method for controlling wireless charging that is capable of controlling the wireless charging by judging whether or not the FOB key is present in a peripheral region of a wireless charging system.

(b) Description of the Related Art

It is known to provide an apparatus and a method for transmitting vehicle wireless power for a smart phone capable of putting a plurality of smart phones or various electronic devices thereon within a vehicle in a contact scheme. It is also known to provide an apparatus and a method for supplying power by performing wireless charging for an electronic device such as a portable terminal, for example, a smart phone within the vehicle in a non-contact scheme. That is, wireless charging of the electronic device such as the smart phone can be carried out within the vehicle using magnetic resonance and electromagnetic coupled resonance. A portable electronic device such as an electronic organizer and a vehicle FOB key system, a smart phone case, a smart phone, and the like, receives power, which is electric energy, within the vehicle by using magnetic resonance and electromagnetic coupled resonance technologies.

Meanwhile, in the electromagnetic coupled resonance technology, in short distance transmission, which is a magnetic resonance type having a transmission distance of about several to ten meters, a frequency on the order of several ten MHz or several hundred MHz used in a mobile phone may be used, and a small amount of energy is transmitted at the same frequency to transmit and receive ends. In theory, electric products installed indoors may be used without wirings and portable apparatuses may be simultaneously operated without a separate power line. Non-contact transmission of which a transmission distance is about several mm to several cm has been actually applied to various devices such a distribution device, a transportation card, and the like. Particularly, in a short distance non-contact energy transmission technology, which uses an inductive coupling phenomenon among wireless power transmission technologies wireless transmitting energy to devices requiring the energy, the energy is transmitted by a current generated between two metal coils facing in parallel with each other and an electromagnetic interaction, and the current is induced from one coil toward the other coil through a magnetic field. Therefore, a relative position and a distance between the two coils and load power should be accurate. In the case in which the two coils are slightly distant from each other or a reference angle is out of a transmission/reception range, transmission efficiency is rapidly decreased. However, in the case in which the two coils are within a predetermined distance and the reference angle is within the transmission/reception range, the transmission efficiency is high.

SUMMARY

Accordingly, an object to be achieved by the present invention is to provide a method for controlling wireless charging depending on an FOB key capable of controlling whether or not wireless charging is to be performed by transmitting a signal informing a peripheral area of a wireless charging mount that the wireless charging is being performed to the peripheral region of the wireless charging mount while the wireless charging is performed and judging a position of the FOB key receiving the signal.

In one aspect of the present invention, there is provided a method for controlling wireless charging depending on a position of an FOB key in a wireless charging system provided in a vehicle and including an output unit, a wireless charging mount, and a controller, including: transmitting, by the controller, a first signal informing a peripheral region of the wireless charging mount in which a wireless charging target is mounted that wireless charging is being performed in the peripheral region of the wireless charging mount when the wireless charging starts; transmitting, by the FOB key receiving the first signal, a second signal corresponding to the first signal to the controller; stopping, by the controller receiving the second signal, the wireless charging; and informing, by the controller, a user of the vehicle that the FOB key is present in the peripheral region of the wireless charging mount through the output unit.

The method for controlling wireless charging depending on a position of an FOB key may further include, after the informing of the user of the vehicle that the FOB key is present in the peripheral region of the wireless charging mount, transmitting, by the controller, the first signal in a state in which the wireless charging is stopped after a preset time elapses; and returning to the informing of the user of the vehicle that the FOB key is present in the peripheral region of the wireless charging mount in the case in which the second signal is again received.

The first signal may be a low frequency (LF) signal, and the second signal may be a radio frequency (RF) signal.

The output unit may be a speaker or a display provided in the vehicle, and the controller may inform the user that the FOB key is present in the peripheral region of the wireless charging mount as an audio signal through the speaker or visually inform the user that the FOB key is present in the peripheral region of the wireless charging mount through the display.

The method for controlling wireless charging depending on a position of an FOB key may further include restarting the stopped wireless charging in the case in which the second signal is not received.

The first signal may be generated by a wireless charging coil included in the wireless charging mount and be transmitted to the peripheral region of the wireless charging mount.

The second signal may be a signal informing the controller that the FOB key receiving the first signal is present in the peripheral region of the wireless charging mount.

BRIEF DESCRIPTION OF THE DRAWINGS

The above and other objects, features and advantages of the present invention will be more apparent from the fol

DETAILED DESCRIPTION OF THE PREFERRED EMBODIMENTS

Figure 1:
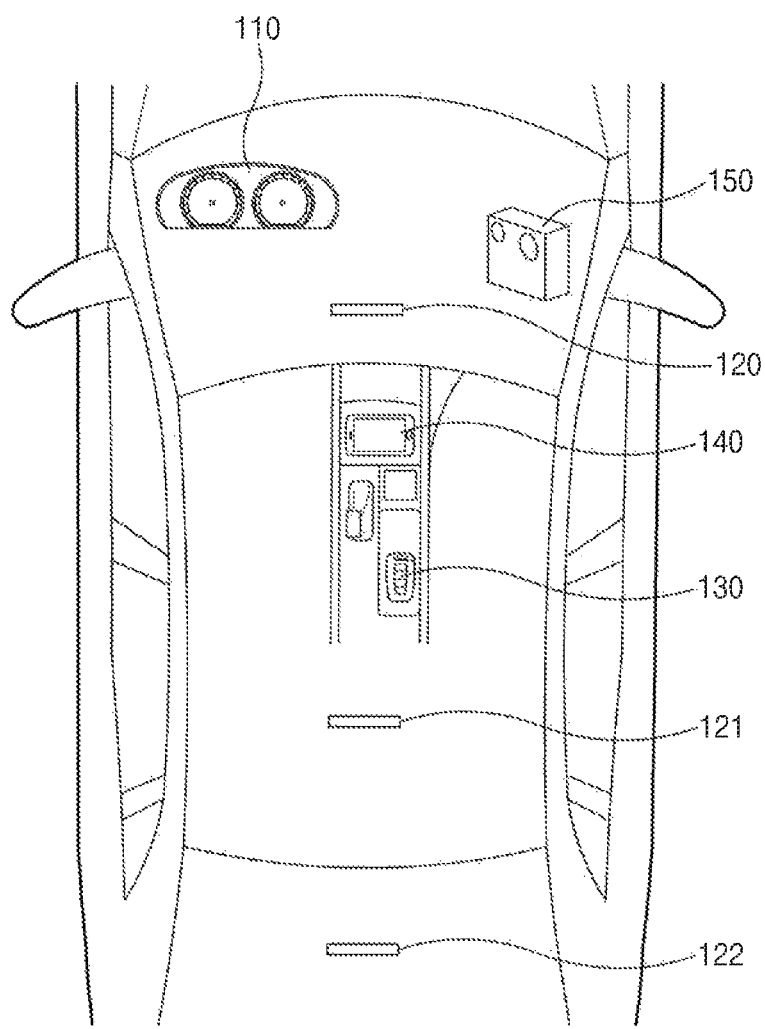
- FIG. 1 is a diagram showing a wireless charging system and an FOB key used in a method for controlling wireless charging depending on a position of an FOB key according to an exemplary embodiment of the present invention.

Advantages and features of the present invention and methods to achieve them will be elucidated from exemplary embodiments described below in detail with reference to the accompanying drawings. However, the present invention is not limited to exemplary embodiments described herein, but may be embodied in different forms. Exemplary embodiments of the present invention are provided in order to describe the present invention in detail so that those skilled in the art to which the present invention pertains may easily implement the scope of the present invention.

In the accompanying drawings, exemplary embodiments of the present invention are not limited to shown specific forms, but will be exaggerated for clarity. Specific terms used in the present specification have been used only in order to describe the present invention, and are not used in order to limit the meaning or limit the scope of the present invention mentioned in the claims.

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, plug-in hybrid electric vehicles, hydrogen-powered vehicles and other alternative fuel vehicles (e.g. fuels derived from resources other than petroleum). As referred to herein, a hybrid vehicle is a vehicle that has two or more sources of power, for example both gasoline-powered and electric-powered vehicles.

The terminology used herein is for the purpose of describing particular embodiments only and is not intended to be limiting of the invention. As used herein, the singular forms "a," "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items.

Further, the control logic of the present invention may be embodied as non-transitory computer readable media on a computer readable medium containing executable program instructions executed by a processor, controller or the like. Examples of computer readable media include, but are not limited to, ROM, RAM, compact disc (CD)-ROMs, magnetic tapes, floppy disks, flash drives, smart cards and optical data storage devices. The computer readable medium can also be distributed in network coupled computer systems so that the computer readable media is stored and executed in a distributed fashion, e.g., by a telematics server or a Controller Area Network (CAN).

Hereinafter, exemplary embodiments of the present invention will be described in detail with reference to the accompanying drawings.

An FOB key system currently used in a vehicle radiates a low frequency (LF) signal to judge whether or not an FOB key is present within the vehicle, in the case in which the FOB key receives the LF signal transmitted from the FOB key system, it transmits a radio frequency (RF) (433.92 MHz) signal to the FOB key system in response to the LF signal to inform the FOB key system that the FOB key is present within the vehicle. That is, in the case in which the FOB key system receives the RF signal transmitted by the FOB key, it may recognize that the FOB key is present within the vehicle.

Meanwhile, the wireless charging system may radiate a high-power LF signal through a coil embedded in a wireless charging mount. The LF signal is applied to a coil for wireless charging included in a wireless charging target device to generate induced electromotive force and charge the induced electromotive force in a battery included in the wireless charging target device.

The LF signal used in the FOB key system in order to judge whether or not the FOB key is present within the vehicle and the signal radiated to a peripheral region of the wireless charging mount by the wireless charging system in order to perform the wireless charging are LF signals similar to each other. In detail, the LF signal used in a process of judging whether the FOB key is present has a frequency of 125 kHz, and the LF signal used in the wireless charging system in order to perform the wireless charging has a frequency of 110 to 205 kHz.

However, since the LF signal used for the wireless charging is used for high-power energy higher as compared with the FOB key system, when the FOB key is positioned in a peripheral region of the wireless charging mount while the wireless charging is performed, the case in which the FOB key may not respond to the LF signal radiated by the FOB key system in order to judge whether the FOB key is present within the vehicle may occur due to interference of electric, waves between the two LF signals. In this case, since it may be recognize that the FOB key is not present within the vehicle, a risk that erroneous information will be provided to a user or a vehicle system will malfunction may occur.

Therefore, in a method for controlling wireless charging depending on a position of an FOB key according to an exemplary embodiment of the present invention in order to prevent this problem, in the case in which the FOB key is present within a distance at which it is affected by the LF signal for wireless charging radiated from the peripheral region of the wireless charging mount when the wireless charging is being performed, the FOB key transmits a signal informing the wireless charging system that it is positioned in the peripheral region of the wireless charging mount to a controller of the wireless charging system at a radio frequency (RF) to stop performing the wireless charging or provide information informing a driver within the vehicle that the FOB key is position in the peripheral region of the wireless charging mount, such that it is affected by the LF signal for wireless charging to the driver (that is, transmit an alert message).

FIG. 1 is a diagram showing a wireless charging system and an FOB key used in a method for controlling wireless charging depending on a position of an FOB key according to an exemplary embodiment of the present invention.

In FIG. 1, a plurality of low frequency (LF) antennas 120 to 122 transmitting LF signals for searching an FOB key, a controller 150 controlling wireless charging, an output unit (cluster) 110 informing a driver whether or not the FOB key is present in a peripheral region of a wireless charging mount, the FOB key 130, and a target device 140 mounted in a peripheral region of the wireless charging mount are shown.

Figure 2:
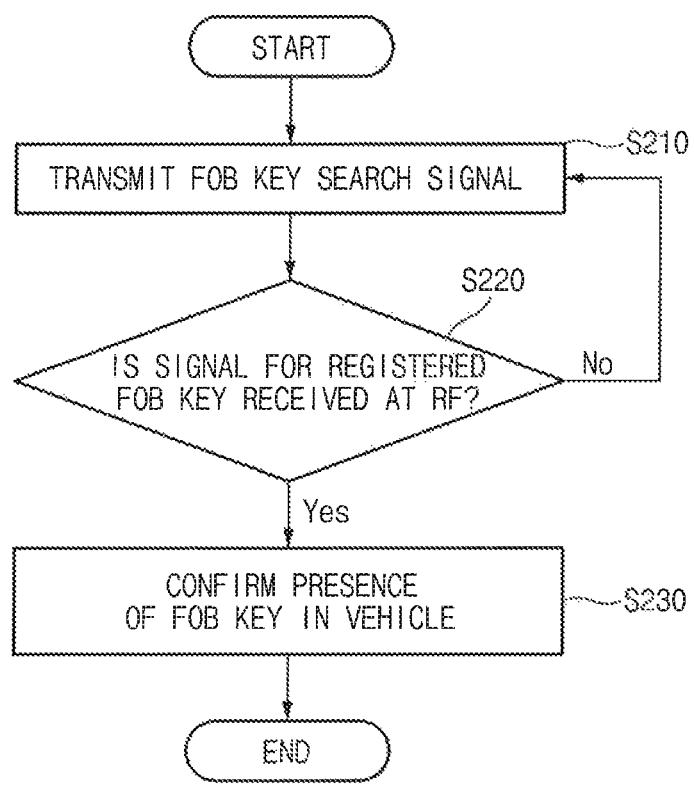
FIG. 2 is a diagram showing a process of confirming whether an FOB key is present within a vehicle in the method for controlling wireless charging depending on a position of an FOB key according to an exemplary embodiment of the present invention.

FIG. 2 is a diagram showing a process of confirming whether an FOB key is present within a vehicle in the method for controlling wireless charging depending on a position of an FOB key according to an exemplary embodiment of the present invention.

The plurality of LF antennas 120 to 122 transmit the LF signals to judge whether or not the FOB key 130 is present with a vehicle. In detail, the signals searching the FOB key 130 is transmitted through the plurality of LF antennas 120 to 122 (S210).

Then, it is judged whether or not an RF signal has been received from the FOB key 130 registered in the vehicle (S220). In the case in which it is judged (YES) that the RF signal has been received from the FOB key 130 registered in the vehicle, it is confirmed that the FOB key 130 is present within the vehicle (S230). Unlike this, it is judged (NO) that the RF signal has not been received from the FOB key 130 registered in the vehicle, a process returns to Step S210 to transmit the signals searching the FOB key 130 through the LF antennas 120 to 122. Through the above-mentioned process, it is judged whether or not the FOB key is present within the vehicle.

Figure 3:
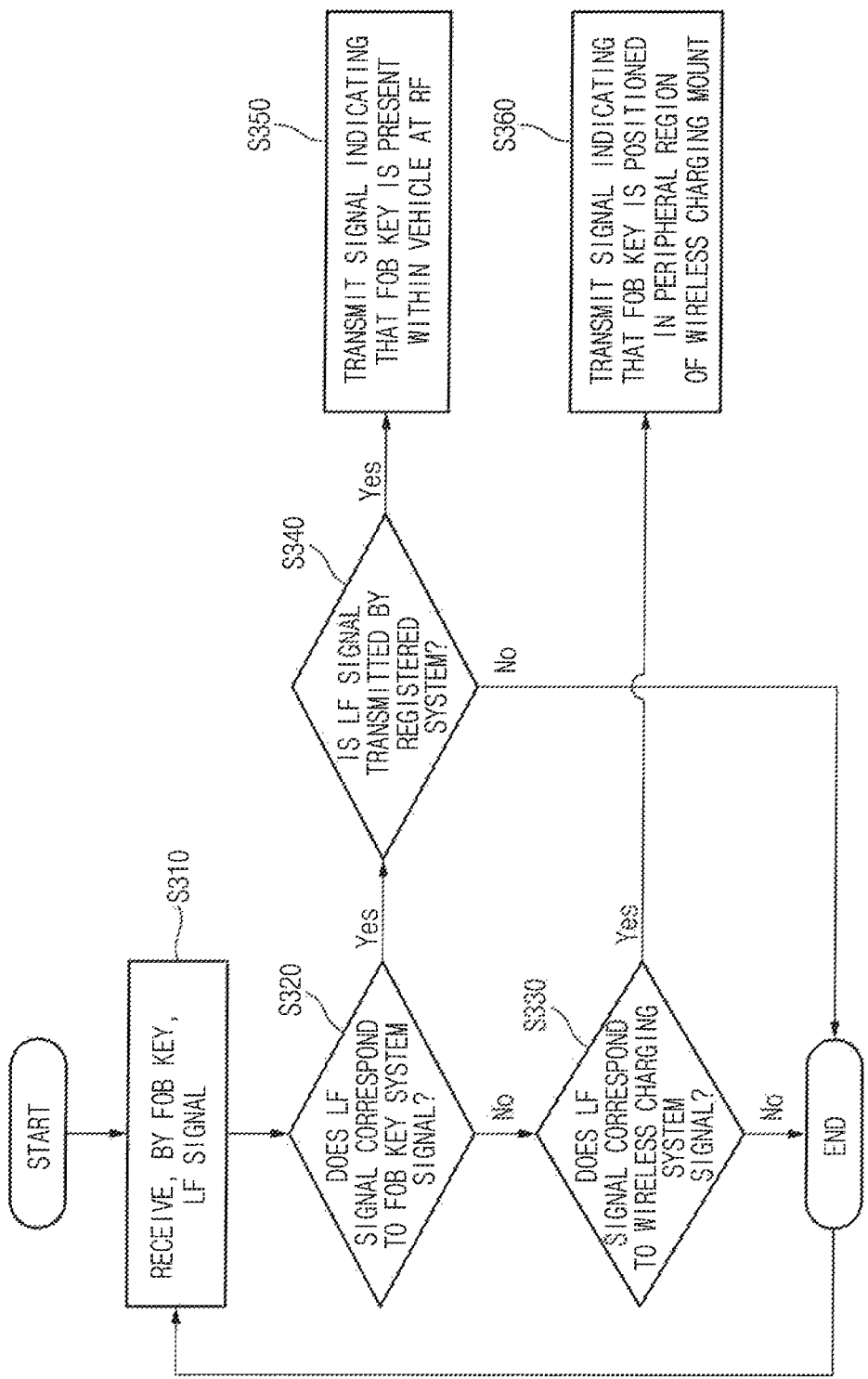
FIG. 3 is a flow chart showing a process of judging whether the FOB key is positioned in a peripheral region a wireless charging mount in the method for controlling wireless charging depending on a position of an FOB key according to an exemplary embodiment of the present invention.

FIG. 3 is a flow chart showing a process of judging whether the FOB key is positioned in a peripheral region of a wireless charging mount in the method for controlling wireless charging depending on a position of an FOB key according to an exemplary embodiment of the present invention. Referring to FIG. 3, in the method for controlling wireless charging depending on a position of an FOB key, it is judged whether or not the FOB key is positioned in the peripheral region of the wireless charging mount through Steps S310 to S360.

FIG. 3 shows a process after a controller included in a wireless charging system transmits a first signal informing the peripheral region of the wireless charging mount in which a wireless charging target is mounted that wireless charging is being performed to the peripheral region of the wireless charging mount, in the case in which the wireless charging starts.

An FOB key receives an LF signal (S310).

Then, it is judged that the received LF signal is an LF signal for searching the FOB key transmitted by an FOB key system (S320). In the case in which it is judged (YES) that the received LF signal is the signal transmitted by the FOB key system, a process proceeds to Step S340 of judging whether or not the LF signal has been transmitted from a registered FOB key system. Unlike this, in the case in which it is judged (NO) that the received LF signal is not the signal transmitted by the FOB key system, the process proceeds to Step S330 of judging whether the received LF signal is a signal transmitted from the wireless charging system.

First in the case in which it is judged (YES) in Step S340 that the LF signal has been transmitted from the registered FOB key system, a signal indicating that the FOB key is present within the vehicle is transmitted to the FOB key system at a radio frequency (RF) (S350). Unlike this, in the case in which is judged (NO) in Step S340 that the LF signal has been transmitted from a nonregistered FOB key system, the received LF signal is ignored (End).

Next, in the case in which it is judged (YES) in Step S330 that the received LF signal is the signal transmitted from the wireless charging system, the FOB key transmits an RF signal (second signal) indicating that it is positioned in the peripheral region of the wireless charging mount to the wireless charging system (or controller). In the case in which it is judged (NO) in Step S330 that the received LF signal is not the signal transmitted from the wireless charging system, the received LF signal is ignored (End).

Figure 4:
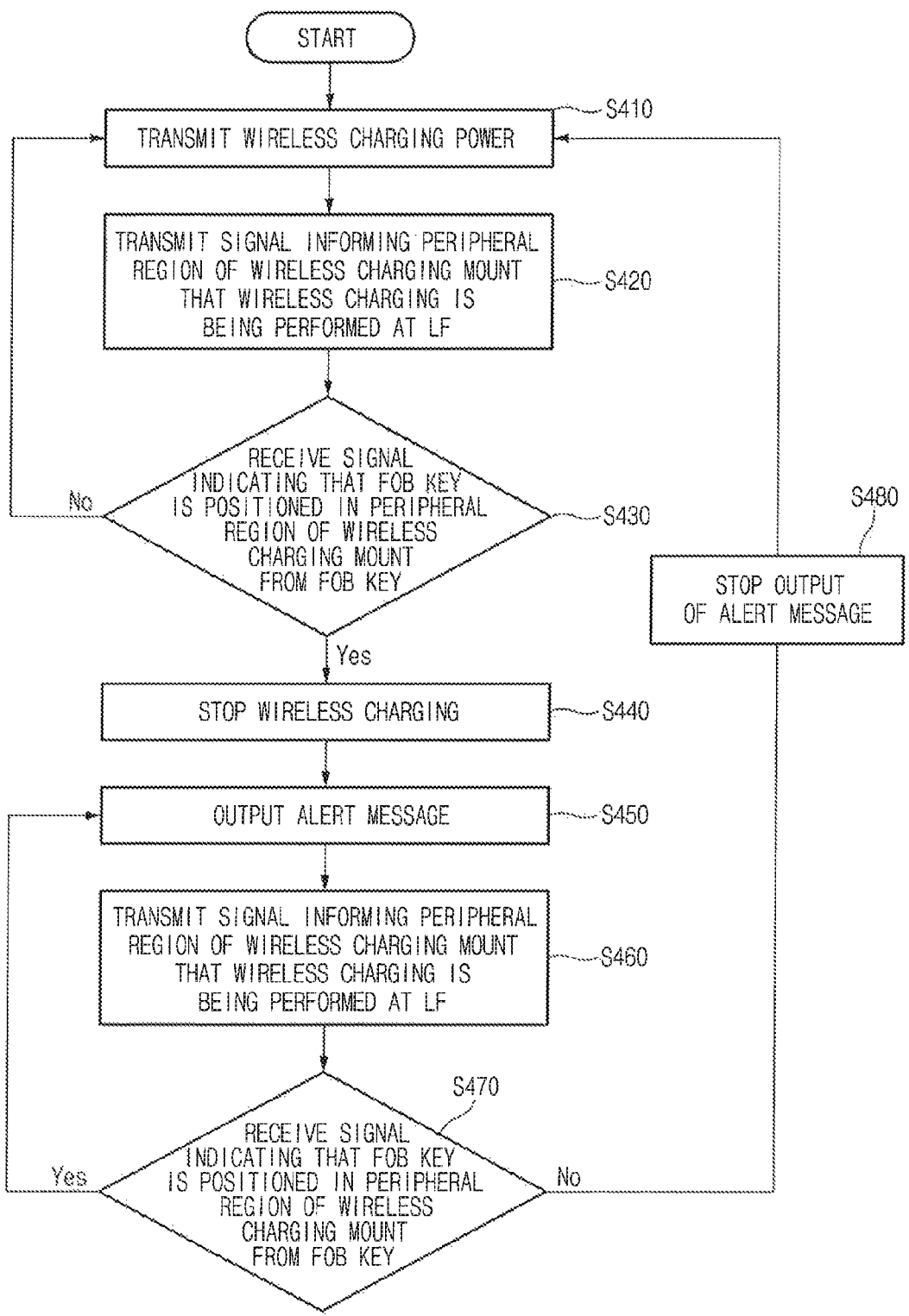
FIG. 4 is a flow chart showing a process of stopping the wireless charging depending on whether or not the FOB key is positioned in the peripheral region of the wireless charging mount in the method for controlling wireless charging depending on a position of an FOB key according to an exemplary embodiment of the present invention.

FIG. 4 is a flow chart showing a process of stopping the wireless charging depending on whether or not the FOB key is positioned in the peripheral region of the wireless charging mount in the method for controlling wireless charging depending on a position of an FOB key according to an exemplary embodiment of the present invention.

Referring to FIG. 4, in the method for controlling wireless charging depending on a position of an FOB key, it is judged whether or not the FOB key is positioned in the peripheral region of the wireless charging mount and operations depending on a judgment result are performed, through Steps S410 to S480.

First, the wireless charging system (or controller) transmits wireless charging power to the peripheral region of the wireless charging mount (S410). Then, the wireless charging system transmits a signal (first signal) informing the peripheral region of the wireless charging mount that wireless charging has started to the peripheral region of the wireless charging mount (S420). Here, the signal (first signal) informing the peripheral region of the wireless charging mount that wireless charging has started may be an LF signal so that it may be received by the FOB key.

Next, the wireless charging system judges whether the FOB key transmits a second signal corresponding to the signal transmitted in Step S420 (S430). That is, in the case in which the FOB key receives the first signal informing the peripheral region of the wireless charging mount that the wireless charging is being performed, it transmits the second signal informing the wireless charging system that it is positioned in the peripheral region of the wireless charging mount to the wireless charging system. That is, in the case in which the corresponding signal is not received (NO), a process again returns to Step S410. However, in the case in which the corresponding signal is received (YES), the wireless charging system stops the wireless charging (S440).

Then, the wireless charging system informs a user of the vehicle that the FOB key is currently present in the peripheral region of the wireless charging mount (S450). Here, the wireless charging system informs the user of the vehicle that the FOB key is currently present in the peripheral region of the wireless charging mount as an audio signal through a speaker or visually informs the user of the vehicle that the FOB key is currently present in the peripheral region of the wireless charging mount through a display.

Then, the wireless charging system again transmits the first signal, which is the LF informing the peripheral region of the wireless charging mount that the wireless charging is being performed to the peripheral region of the wireless charging mount in a state in which the wireless charging is stopped after a preset time elapses (S460). It is to confirm whether or not the FOB key has moved in the peripheral region of the wireless charging mount after an alert message.

In the case in which it is judged (YES) in Step 470 that the second signal is again received, a process again proceeds to Step S450 of informing the user of the vehicle that the FOB key is currently present in the peripheral region of the wireless charging mount. Unlike this, in the case in which it is judged (NO) in Step 470 that the second signal is not again received, an output of a message informing the user that the FOB key is currently present in the peripheral region of the wireless charging mount is stopped (S480), and the process returns to Step S410, such that the wireless charging restarts.

As a result, in the method for controlling wireless charging depending on a position of an FOB key according to an exemplary embodiment of the present invention, the FOB key transmits the RF signal informing the wireless charging system that it is positioned in the peripheral region of the wireless charging mount in the case in which the wireless charging is being performed, such that it is judged that the FOB key is positioned in the peripheral region of the wireless charging mount to stop the wireless charging or inform the driver within the vehicle that the FOB key is positioned in the peripheral region of the wireless charging mount to have an effect on the LF signal for the wireless charging and again perform safely the wireless charging only in the case in which the FOB key moves in the peripheral region of the wireless charging mount.

In the method for controlling wireless charging depending on a position of an FOB key according to an exemplary embodiment of the present invention, the signal informing the peripheral area of the wireless charging mount that the wireless charging is being performed is transmitted to the peripheral region of the wireless charging mount while the wireless charging is performed, and the position of the FOB key receiving the signal is judged, thereby making it possible to control whether or not the wireless charging is to be performed.

Although the present invention has been described through specific exemplary embodiments hereinabove, it may be variously modified without departing from the scope of the present invention. Accordingly, the scope of the present invention is not to be construed as being limited to the above-mentioned exemplary embodiments, but is to be defined by the following claims and equivalents thereto. When considering the above-mentioned contents, it is to be in considered that the present invention includes modifications and alternations thereof as long as these modifications and alternations are within the scope of the following claims and equivalents thereto.

What is claimed is:

1. A method for controlling wireless charging depending on a position of an FOB key in a wireless charging system provided in a vehicle and including an output unit, a wireless charging mount, and a controller, comprising:
   transmitting, by the controller, a first signal informing a peripheral region of the wireless charging mount in which a wireless charging target is mounted that wireless charging is being performed in the peripheral region of the wireless charging mount when the wireless charging starts;
   transmitting, by the FOB key receiving the first signal, a second signal corresponding to the first signal to the controller;
   stopping, by the controller receiving the second signal, the wireless charging;
   informing, by the controller, a user of the vehicle that the FOB key is present in the peripheral region of the wireless charging mount through the output unit;
   transmitting, by the controller, the first signal in a state in which the wireless charging is stopped after a preset time elapses after informing the user of the vehicle that the FOB key is present in the peripheral region of the wireless charging mount; and
   returning to the step of informing the user of the vehicle that the FOB key is present in the peripheral region of the wireless charging mount in a case in which the second signal is again received.

2. The method for controlling wireless charging depending on a position of an FOB key according to claim 1, wherein the first signal is a low frequency (LF) signal, and the second signal is a radio frequency (RF) signal.

3. The method for controlling wireless charging depending on a position of an FOB key according to claim 1, wherein the output unit is a speaker or a display provided in the vehicle, and
   the controller informs the user that the FOB key is present in the peripheral region of the wireless charging mount as an audio signal through the speaker or visually informs the user that the FOB key is present in the peripheral region of the wireless charging mount through the display.

4. The method for controlling wireless charging depending on a position of an FOB key according to claim 1, further comprising restarting the stopped wireless charging in the case in which the second signal is not received.

5. The method for controlling wireless charging depending on a position of an FOB key according to claim 1, wherein the first signal is generated by a wireless charging coil included in the wireless charging mount and is transmitted to the peripheral region of the wireless charging mount.

6. The method for controlling wireless charging depending on a position of an FOB key according to claim 1, wherein the second signal is a signal informing the controller that the FOB key receiving the first signal is present in the peripheral region of the wireless charging mount.

* * * * *